(12) United States Patent
Day (10) Patent No.: US 8,084,716 B2
(45) Date of Patent: Dec. 27, 2011

(54) HEATED GLASS GUARD WITH SENSORLESS CONTROL FOR FORKLIFT TRUCKS

(75) Inventor: Richard M. Day, Port Crane, NY (US)

(73) Assignee: The Raymond Corporation, Greene, NY (US)

( * ) Notice: Subject to any disclaimer, the term of this patent is extended or adjusted under 35 U.S.C. 154(b) by 1229 days.

(21) Appl. No.: 11/763,953

(22) Filed: Jun. 15, 2007

(65) Prior Publication Data
US 2008/0308542 A1    Dec. 18, 2008

(51) Int. Cl.
*H05B 1/02* (2006.01)

(52) U.S. Cl. ........ 219/203; 219/494; 219/495; 219/496; 219/497

(58) Field of Classification Search .......... 219/203, 219/202, 204, 205, 494, 495, 496, 497
See application file for complete search history.

(56) References Cited

U.S. PATENT DOCUMENTS

| | | | |
|---|---|---|---|
| 4,277,672 A | 7/1981 | Jones | |
| 5,003,160 A * | 3/1991 | Matsuo et al. | 219/494 |
| 5,632,917 A | 5/1997 | Cummins et al. | |
| 6,037,573 A | 3/2000 | Arsenault et al. | |
| 6,163,013 A | 12/2000 | King et al. | |
| 6,359,265 B1 | 3/2002 | Fe | |
| 6,624,396 B2 * | 9/2003 | Witt et al. | 219/497 |
| 6,917,019 B2 * | 7/2005 | Richter | 219/505 |

FOREIGN PATENT DOCUMENTS

| | | |
|---|---|---|
| DE | 100 42 563 A1 | 3/2002 |
| DE | 10 2005 055003 A1 | 5/2007 |
| EP | 0 991 301 A1 | 4/2000 |
| EP | 1 234 736 A1 | 8/2002 |
| EP | 1 318 697 A | 6/2003 |
| WO | 01/39549 A | 5/2001 |

OTHER PUBLICATIONS

European Search Report dated Sep. 24, 2008.

\* cited by examiner

*Primary Examiner* — Mark H Paschall
(74) *Attorney, Agent, or Firm* — Quarles & Brady LLP (57) ABSTRACT

An open forklift truck is provided having an elongated windshield that protects the operator from wind chills experienced when operating the truck in a cold storage environment. The windshield is a laminate having a plurality of heating elements disposed therein that are electrically connected to a control that monitors speed, battery voltage, temperature, and ambient feedback and adjusts the power supply to the windshield based on this feedback. Accordingly, the windshield is maintained at a predetermined temperature selected to limit condensation and fogging of the windshield.

23 Claims, 5 Drawing Sheets

HEATED GLASS GUARD WITH SENSORLESS CONTROL FOR FORKLIFT TRUCKS

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to forklift trucks, and in particular, relates to an improved method and apparatus for preventing fog and condensation from accumulating on a windshield of a forklift truck that traverses between environments having varying temperatures.

When operating a forklift vehicle at higher speeds in cold storage environments, where temperatures can typically reach as low as −25° F., a significant wind chill is experienced by the operator, thereby causing discomfort. It is therefore desirable to install a windshield in the truck that will protect the operator from the winds associated with operation of the forklift track in the cold environment and reduce operator discomfort.

However, because forklift trucks typically traverse between cold storage applications and warm environments, the windshield may experience significant temperature differentials of more than 100° F. Moreover, due to the cold air flow within the cold storage application, various locations on the windshield may be colder than others. Additionally, because the temperature of the cold storage application is commonly less than the dew point of the warmer environment, condensation can accumulate on the windshield when the truck travels from the cold storage application into the warmer environment. Subsequently, when the truck travels back into the cold environment, the condensation can freeze on the windshield. The condensation and frozen condensation can obstruct the operator's view. Furthermore, frozen condensation can render the forklift track unavailable for an extended amount of time.

As a result of the significant drawbacks currently associated with installing a windshield on forklift trucks that traverse between environments having significantly varying temperatures, a wire mesh is conventionally used in place of a windshield so as to prevent condensation from obstructing the operator's view. However, the wire mesh inadequately shields the operator from the potentially severe wind chills that are produced during operation of the forklift truck.

Because of these problems, heated windshield assemblies have also been constructed for use in forklift trucks operated in cold storage environments. These assemblies maintain appropriate temperature levels to reduce fogging and condensation from obstructing an operator's view, as discussed above, and have typically employed temperature sensors provided on the windshield to directly monitor the temperature. These heating devices, however, require additional components that add cost to the vehicle.

BRIEF SUMMARY OF THE INVENTION

The present invention provides a forklift or other material handling vehicle with a heated windshield for use in a cold storage environment. Environmental parameters, such as the ambient temperature of vehicle operation, and vehicle parameters, such as the speed of the vehicle and the battery voltage, are monitored using sensors in the vehicle and an on-board controller, and the feedback is used to adjust the power supply to the windshield in order to maintain the temperature at an appropriate level.

In accordance with a first aspect of the invention, a man-operated vehicle of the type powered by a battery and including a traction motor configured to move the vehicle between a first location having a cold storage temperature, and a second location having a dew point temperature greater than the cold storage temperature, is provided. The vehicle comprises a windshield member having first and second surfaces exposed to the ambient environment. A heating assembly is disposed within the windshield member and configured to supply heat to the windshield. A control circuit is provided for supplying power to the heating assembly. The control circuit comprises a temperature sensor for sensing ambient temperatures, a speed sensor for sensing a speed of the man-operated vehicle, and a power regulator connected to the heating assembly. A controller is in electrical communication with the heating assembly, the temperature sensor and the speed sensor, and is operable to drive the power regulator to maintain the windshield at a predetermined temperature and to adjust the power supply to the heating assembly from the power regulator based on at least one of a rate of the sensed ambient temperature, the sensed speed of the man-operated vehicle, and a voltage level of the battery.

In another aspect, a method for heating a windshield in an open, man operated, vehicle to prevent condensation from accumulating on the windshield as it travels between a cold location and a warm location is provided. The steps of the method include sensing an ambient temperature, calculating a temperature of the windshield, and applying electrical power to a heating assembly in the windshield to heat the windshield to a predetermined regulation temperature. The power supplied to the windshield is adjusted based on at least one of a speed of the vehicle and a rate of change of the ambient temperature while the vehicle is in operation.

In still another aspect of the invention, a forklift vehicle is provided including a battery, a traction motor powered by the battery and configured to move the vehicle between a first location having a cold storage temperature, and a second location having a dew point temperature greater than the cold storage temperature, an operator compartment coupled to the traction motor and allowing an operator to ride in the vehicle, and a windshield member coupled to said operator compartment and having first and second surfaces exposed to the ambient environment. The first surface of the windshield faces the operator compartment, and the second surface faces away from the operator compartment. A heating assembly is disposed within the windshield member and configured to supply heat thereto, and a control circuit is provided for supplying power to the heating assembly.

The control circuit comprises a temperature sensor for sensing ambient temperatures, a speed sensor for sensing a speed of the man-operated vehicle, a voltage sensor for sensing a voltage of the battery, and a switching element for providing a switched power supply to the heating assembly. A controller is in electrical communication with the heating elements, the temperature sensor and the speed sensor, and is operable to drive the switching element at a switching rate selected to supply electrical power to the heating assembly to heat the windshield to a predetermined temperature and to adjust the switching rate based on at least one of a sensed voltage level of the battery, a sensed ambient temperature and a sensed speed of the man-operated vehicle.

These as well as other features and characteristics of the present invention will be apparent from the description which follows. In the detailed description below, preferred embodiments of the invention will be described with reference to the accompanying drawings. These embodiments do not represent the full scope of the invention. Rather the invention may be employed in other embodiments, and reference should therefore be made to the claims herein for interpreting the breadth of the invention.

BRIEF DESCRIPTION OF THE DRAWINGS

Reference is hereby made to the following figures in which like reference numerals correspond to like elements throughout and in which.

DETAILED DESCRIPTION OF THE INVENTION

Figure 1:
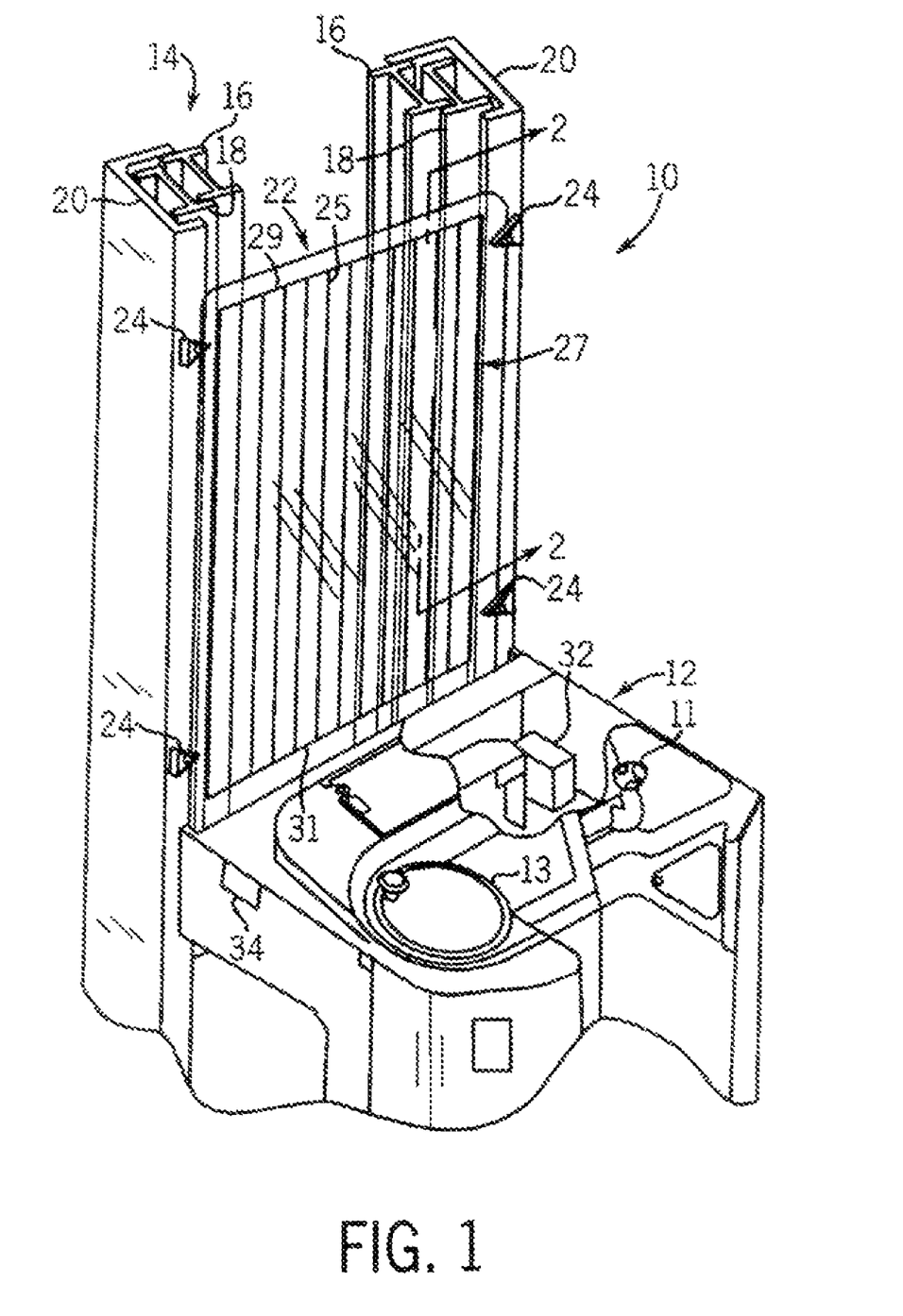
FIG. 1 is a perspective view of a portion of a forklift truck employing the temperature control system of the preferred embodiment with a section of the operator console cut away.

Referring initially to FIG. 1, a portion of an open forklift track 10 is illustrated having an operator console 12 and a telescoping assembly 14 that supports the forklift (not shown). The telescoping assembly 14 includes a pair of elongated I-beams 16 that are supported in a vertical orientation by elongated beams 18 and 20.

The forklift track 10 operates under a plurality of controls located on the operator console 12, including a control handle 11, a steering column 13, and an array of switches. The control handle 11 provides an independent electrical position signal to control a respective one of the lift/lower, reach/retract, tilt and side shift functions of the forks by means of working hydraulics fitted to the truck, and controls the travel speed of the vehicle during forks first and forks trailing operations. Although a control handle 11 is illustrated in accordance with the preferred embodiment, it should be appreciated that any suitable alternative control apparatus could be used that is capable of producing a desired response. The use of a control handle 11 is preferred because it requires less operator effort than conventional hydraulic levers and facilitate longer working periods involving complex maneuvers without unduly tiring the operator.

Referring still to FIG. 1, the steering column 13 controls the orientation of the forklift truck 10. During operation of the truck 10, the operator is typically positioned immediately behind the operator console 12, to allow for easy access to the controls, and between the I-beams 16, 18, 20 at various lifting stages to maximize his or her field of vision. The forklift truck 10 is, of course, mobile and suitable for use in cold storage applications typically having a temperature as low as −25° F. or, in sonic cases, even lower.

The truck 10 includes a windshield assembly 22 that is secured by a plurality of brackets 24 that are mounted onto the beams 20 in an overlapping relationship with the windshield assembly. The windshield assembly 22 has an extended height sufficient to significantly reduce the wind chill effect that is experienced by the operator during operation of the forklift truck 10 at high speeds in the cold storage environment.

The windshield assembly 22 is preferably constructed of a laminate that includes first and second layers of tempered glass 28 and 26 having an inner surface 21 and an outer surface 23, respectively. Because the forklift truck 10 is an open vehicle, both surfaces 21 and 23 are exposed to the ambient environment and are capable of producing condensation when the truck 10 travels from the cold storage application to the warmer environment. Although tempered glass is described, it should be appreciated that the windshield assembly could comprise any alternative suitable material that is readily heated, and that is adequately transparent such that the operator's vision is unobstructed.

As shown in FIG. 1, a heating assembly 27 includes a plurality of thin elongated heating copper wires 25 that are sandwiched between the two layers of glass 26 and 28. The wires 25 extend vertically and are spaced equidistantly apart across the entire width of the windshield assembly 22. Each wire 25 is connected at its top end to a bus bar 29, formed from tinned copper foil, that extends across the top of the windshield assembly 22. A similar bus bar 31 that extends across the bottom of the windshield assembly 22 is connected to the wires 25 at their lower ends. The wires 25 and bus bars 29 and 31 may be formed from any suitable conductive material. Because the wires 25 are embedded within the windshield assembly 22, they are capable of maintaining the temperature of both surfaces 21 and 23 greater than the dew point of the warmer environment. Additionally, because the wires 25 are preferably disposed equidistantly between the inner and outer surfaces 21 and 23, equal amounts of heat are applied to each surface, thereby maintaining the surfaces at substantially the same temperature, further reducing the risk of condensation from accumulating on one of the surfaces. If should be appreciated that the wires 25 could alternatively extend horizontally in accordance with an alternate embodiment.

In accordance with the preferred embodiment, the heating assembly 27 is placed between the tempered glass sections 26 and 28, which are adhesively attached to each other using an adhesive, such as PVB. It should be appreciated, however, that any alternative suitable windshield laminate having a heating assembly therein, and that is capable of maintaining the temperature of the inner and outer surfaces 21 and 23 greater than the dew point of the warmer environment may be used, as would be understood by one having ordinary skill in the art.

As will be described in more detail below, the bus bars 29 and 31 form part of a control circuit 36 which conducts current to the heating wires 25. As is well known in the art the current flow through the wires 25 produces heat proportional to the resistance and the square of the current ($I^2*R$), and this heat is conducted relatively uniformly throughout the windshield assembly 22. As a result, the wires 25 are configured to supply heat to both layers 26 and 28 of the windshield assembly 22 to maintain the temperature of the inner surface 21 substantially the same as the temperature of the outer surface 23, thereby preventing condensation from accumulating on either surface of the assembly.

Figure 2:
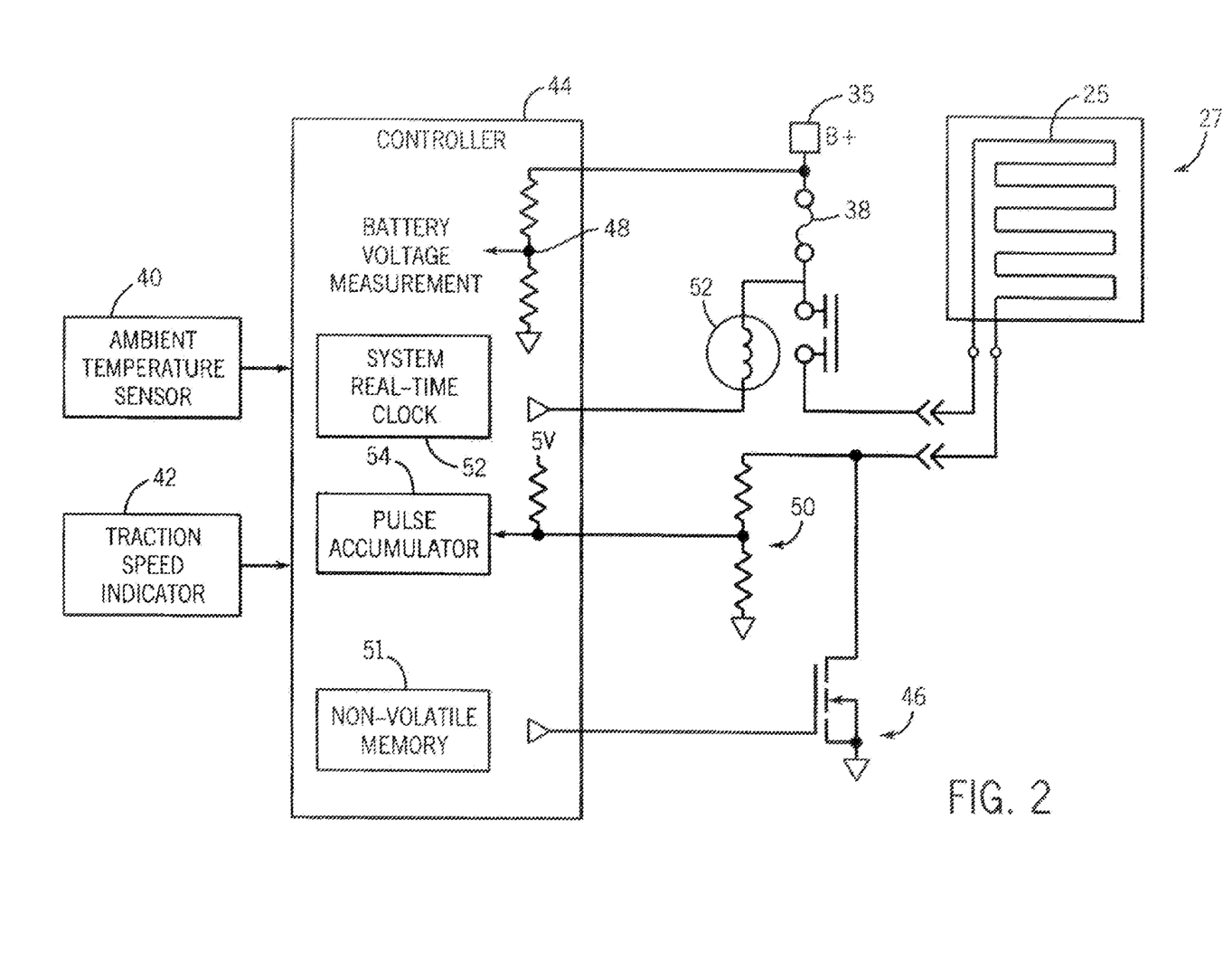
FIG. 2 is an electrical schematic diagram of a control circuit in accordance with a preferred embodiment of the invention.

Referring now also to FIG. 2, a control circuit 36 for controlling the heating of the tempered glass of the windshield assembly 22 is schematically illustrated. The control circuit 36 includes a controller 44, which can be a microprocessor, microcontroller, or other device, including either an on-board or separate memory component 51, a real time clock 52, and circuitry for counting and accumulating pulses, shown here as pulse accumulator 54. The controller 44 drives a switching element 46, such as a drive transistor, that is coupled to the heating assembly 27 in the windshield assembly 22 to provide a switching power supply, and a contactor or relay 52 which provides power to and removes power from the heating assembly 27. The controller 44 receives feedback from a temperature sensor 40, a speed sensor 42, and voltage dividers 48 and 50, which are coupled to the battery 35 and the switching element 46, respectively. Material constants and other data related to the heating assembly 27 and windshield assembly 22 are stored in the memory 51 for use in calculating temperatures, as described below. These constants can include a maximum allowable heating temperature, which is based on the adhesive used to attach the heating assembly 27 to the windshield 22, and heating and resistance constants related to the wire in the heating assembly, including a heater wire resistance versus heater wire temperature and heater wire thermal resistance (temperature rise per unit power). Additionally, material constants and other data related to the glass forming the windshield, including glass surface thermal resistance (surface temperature rise per unit power applied), glass surface heating time constant, glass surface cooling time constant, and glass surface thermal loss versus truck speed, are stored in the memory 51. This stored data is retrieved from memory 51 and used in calculating the power applied to the windshield 22 as described below.

In operation, the controller 44 receives a temperature feedback signal from the ambient temperature sensor 40, and a speed feedback signal from a traction speed indicator 42. Battery voltage feedback is sensed at the voltage divider 48, which is coupled to the battery 35 through a fuse 38. Application of power to the heating assembly 27 is similarly sensed at the voltage divider 50, which is coupled to the drain of drive transistor 46, and provides feedback indicating the number of pulses applied to the heating assembly 27 from the transistor 46. Based on the feedback, the controller 44 drives the drive transistor 46 using a pulse width modulated algorithm to provide power to the heater assembly 27. Two modes of operation are provided, a warm-up mode, which is entered when the forklift truck 10 is powered up; and a regulation mode, which is entered when the glass components of windshield assembly 22 reach a predetermined temperature, as described more fully below.

Figure 3:
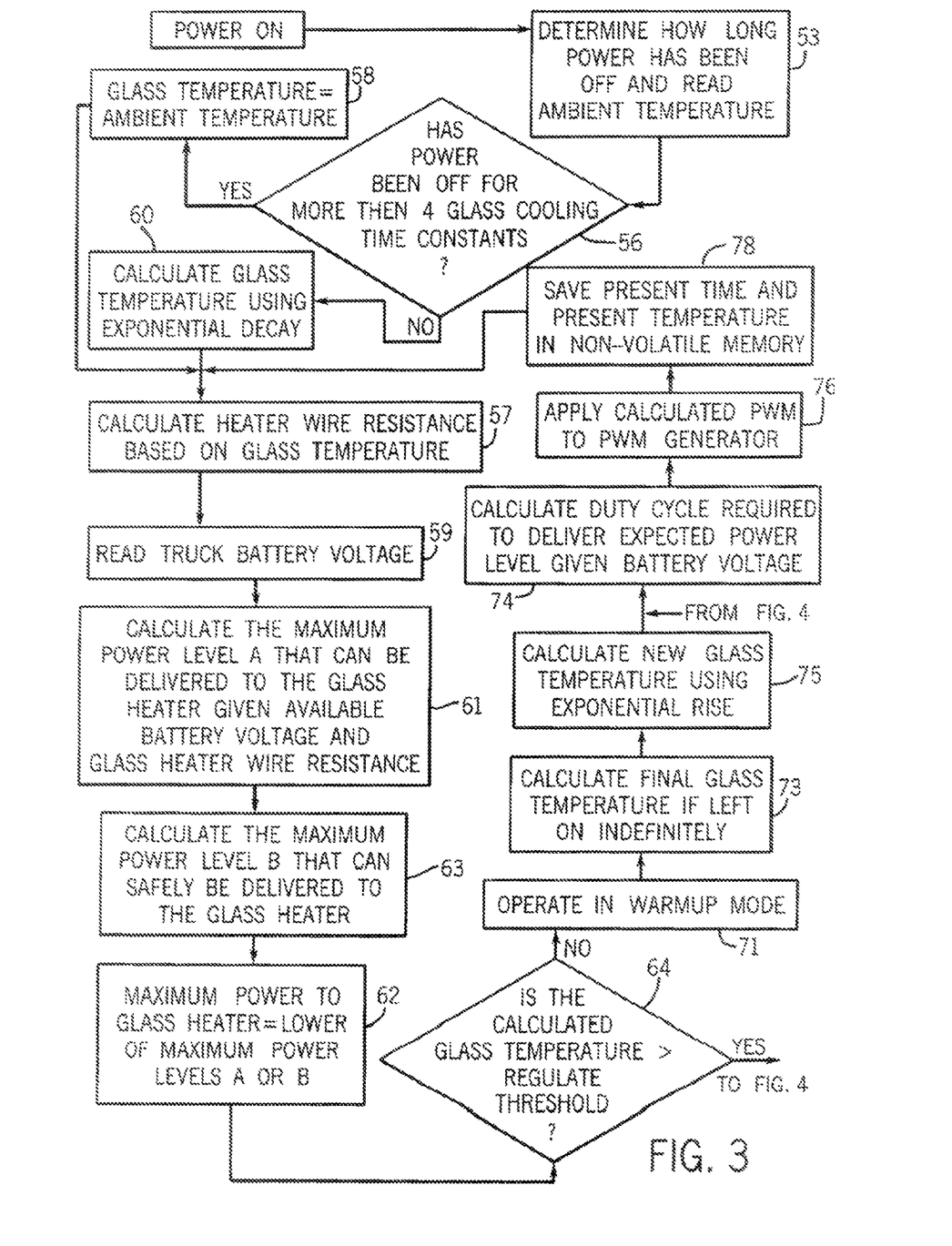
FIGS. 3 and 4 are a flow chart illustrating control of the heated glass guard.
Figure 4:
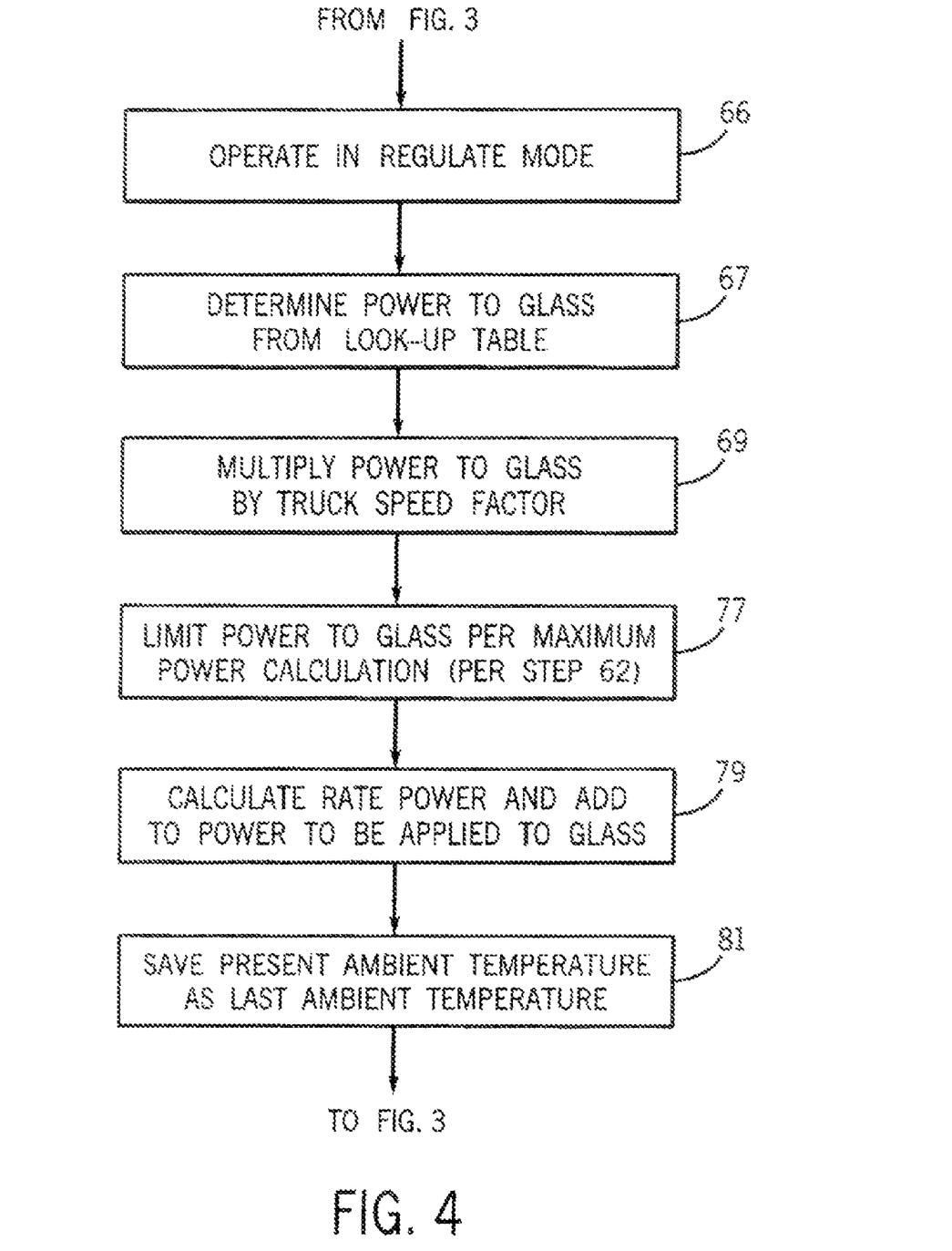

Referring now to FIGS. 3 and 4, a flow chart illustrating operation of the control circuit 36 is shown. Initially, when power is turned on, the controller 44 calculates a time that the truck has been powered down or "off", and reads the ambient temperature (step 55). The controller 44 then determines whether the "off" time exceeds four cooling time constants (step 56) based on timing data from the real time clock 52, and the cooling time constant that is retrieved from memory 51. If so, the temperature of the glass component of the windshield 22 is assumed to be the ambient temperature, as determined by feedback from the ambient temperature sensor 40 (step 58). If not, controller 44 calculates the temperature of the glass using the following formula (step 60):

glass temperature=last glass temperature*
($e^{-(time\ off/cooling\ time\ constant)}$))

Here, the last glass temperature can, again, be retrieved from memory 51. After the glass temperature is determined, the controller 44 calculates the heater wire resistance (step 57), using the following equation:

heater wire resistance=(resistance at 25C)+
(glass temperature*wire resistance thermal constant)

Here, the wire resistance thermal constant is given in ohms per degrees C. After the heater wire resistance is calculated, controller 44 reads the truck voltage from the battery (step 59), and calculates the maximum amount of power that can be safely applied to the heating assembly 27 (step 63), and the maximum power that can be applied based on the current voltage level of battery 35 (step 61), based on feedback sensed from the voltage divider 48. The maximum power which can be safely applied to the windshield 22 is given by the following equation:

$$power = \frac{\left(\begin{array}{c}\text{maximum allowable glass temperature} -\\ \text{ambient temperature}\end{array}\right)}{(\text{heater wire thermal resistance})}$$

Here, the heater wire thermal resistance is a material parameter given in degrees C. per watt. The maximum power which can be applied given the present voltage of batter 35 is given by the following equation:

$$power = \frac{(\text{battery voltage})^2}{(\text{heater wire resistance})}$$

After these values are calculated, the controller 44 selects the lower of the of the two maximum power calculations (step 62), to be used in further calculations below.

The controller 44 then compares the calculated temperature to a predetermined temperature level at which the temperature regulation mode is entered, which can be, for example, 100° F. (step 64). If the calculated temperature is equivalent to the predetermined regulation temperature, the controller 44 enters the "regulate" mode (step 66). If not, the controller 44 continues to regulate the windshield 22 in the "warm up" mode (step 71), applying the selected maximum power level to the heating assembly 27 by controlling the transistor 46, and, in step 73, calculating the glass temperature using the following equations:

final glass temperature=ambient temperature*
(power applied to windshield)*
(glass surface thermal resistance)

glass temperature=final glass temperature*
($1-e^{-(time\ off/heating\ time\ constant)}$))

where the final glass temperature is the temperature that the windshield temperature would rise to if the heater was left on indefinitely, and where the glass surface thermal resistance is a material constant in degrees C. per watt.

After the temperature is calculated, the controller 44 then calculates the pulse width modulated (PWM) duty cycle for driving the transistor 46 based on the selected value using the following equation:

$$PWM\ duty\ cycle = \frac{(\text{power to glass} \times \text{heater wire resistance})}{(\text{battery voltage})^2}$$

which is derived by combining the following formulas $$\text{required RMS current} = \sqrt{\left(\frac{\text{required power}}{\text{heater wire resistance}}\right)}$$

and $$\text{duty cycle} = \left(\frac{(RMScurrent)}{(I_{on})}\right)^2 = \left(\frac{(RMScurrent)}{\left(\frac{\text{battery voltage}/}{\text{heater wire resistance}}\right)}\right)^2$$

After the PWM duty cycle is calculated in step 74, the controller adjusts commands to the transistor 46 to drive the transistor at the calculated duty cycle in step 76. In step 78, the time and glass temperature values are saved in memory 51, and the controller 44 returns to step 57 to again calculate the heater wire resistance.

Figure 5:
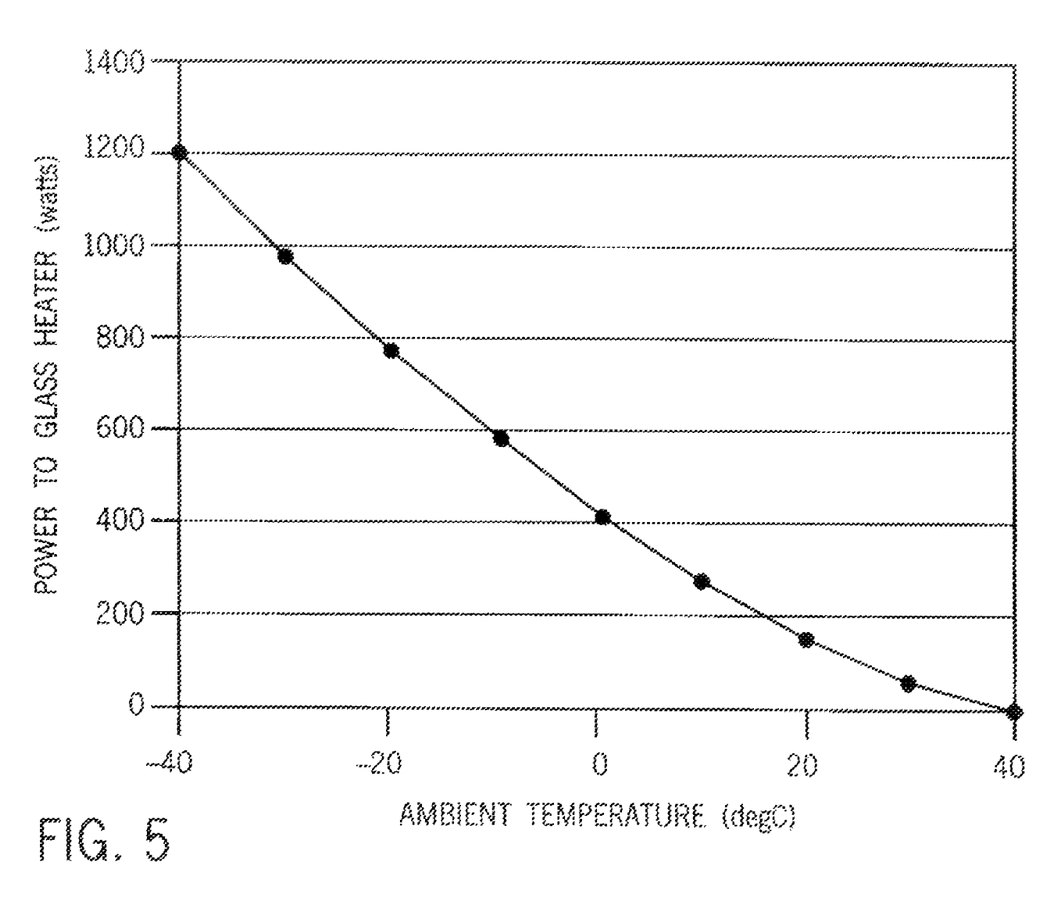
FIG. 5 is a graphic illustrating power provided to the glass versus ambient temperature.

Referring now to FIG. 4, when the calculated glass temperature exceeds the regulate threshold in step 64, the controller 44 does not enter the warm up mode in step 71, but instead enters the regulate mode 66. In the regulate mode 66, the power to be applied to the glass is determined by reference to a look-up table including empirical values relating applied power to the ambient temperature, as shown in FIG. 5. The value retrieved from the table is then multiplied by a truck speed factor in step 69, as follows:

power to glass=power to glass*truck speed factor where the Truck Speed Factor is calculated as:

truck speed factor=(1+(0.0429*truck speed in MPH))

This adjustment linearly adjusts the power applied to the glass from a 0% adjustment when the truck is not moving to a 30% boost of the power applied to the glass when the truck is moving at a speed of 7 miles per hour. The controller 44 compares the calculated power to the maximum value calculated in step 62 above, and applies the lower of the calculated value and the maximum value in step 77. In step 79, the controller 44 adjusts the power applied to the windshield to account for thermal time lags using a differentiator response. A "rate power" term is first calculated by taking the derivative of the ambient temperature with respect to time and multiplying it by a scaling constant:

rate power=(temperature lag constant)*
(d(ambient temperature)/dt)

When using a digital controller, the derivative is computed using the presently measured ambient temperatures as well as a previously measured ambient temperature taken at a known time interval. The temperature lag constant is determined empirically, and is adjusted to minimize the windshield temperature variation when the vehicle is moved from one ambient temperature to another, such as when driving in and out of a freezer. Although this constant can vary somewhat depending on the vehicle used, in this application, the constant was calculated empirically to be substantially 200 watt-seconds per degrees C.

The rate power term is then added to the previously calculated value of power to be applied to the windshield to get the final amount of power to be applied to the windshield:

power to glass=power to glass+rate power

After the appropriate power level is calculated, the present ambient temperature is saved for reference in the next loop of control, and the controller 44 advances to step 74 (FIG. 3), described above. The controller then returns to step 57 (FIG. 3). The loop between step 57 and step 78 continues as long as the power to the truck stays on.

As power is applied, the controller 44 monitors the transistor 46 by counting pulses from the voltage divider 50. No edges are counted if the drive transistor 46 has failed, either shorted or opened, if the beat system 25 fails, either shorted or opened, if the contactor 52 fails open, or if the fuse 38 fails open. Under these circumstances, the operator is alerted to the failure through either a visual or audio indicator and the maximum speed that the forklift truck is capable of reaching is reduced to minimize the effects of fogging on the windshield. To maintain efficiency of the vehicle, the reduction in speed can be applied only when the truck is moving in the forks first direction and the operator is facing the windshield.

The above has been described as a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. A man-operated vehicle of the type powered by a battery and including a traction motor configured to move the vehicle between a first location having a cold storage temperature, and a second location having a dew point temperature greater than the cold storage temperature, the vehicle comprising:
    a windshield mounted onto said vehicle having first and second surfaces exposed to the ambient environment of vehicle operation, wherein the first surface faces an operator console, and the second surface faces away from the operator console;
    a heating assembly disposed within the windshield and configured to supply heat thereto; and
    a control circuit for applying power to the heating assembly, the control circuit comprising:
        a temperature sensor for sensing an ambient temperatures of vehicle operation;
        a speed sensor for sensing a speed of the man-operated vehicle;
        a power regulator connected to the heating assembly; and
        a controller in electrical communication with the heating assembly, the temperature sensor and the speed sensor, the controller being operable to drive the power regulator to maintain the windshield at a predetermined temperature and to adjust the power being applied to the heating assembly from the power regulator based on at least one of a rate of change of the sensed ambient temperature of vehicle operation, the sensed speed of the man-operated vehicle, and a voltage level of the battery.

2. The vehicle as recited in claim 1, wherein the controller is further operable to calculate a maximum power level that can be applied to the windshield, and a necessary power level to maintain the windshield at the predetermined temperature at the sensed ambient temperature of vehicle operation and the sensed truck speed, and to control the power regulator to deliver power at the lower of the maximum power level and the necessary power level.

3. The vehicle as recited in claim 2, wherein the controller is further operable to calculate a maximum power level that can be applied at the sensed battery voltage level, and to deliver power at the lower of the maximum power level, the necessary power level, and the maximum power level at the sensed battery voltage.

4. The vehicle as recited in claim 1, wherein the power regulator comprises a switching element, and the controller is further operable to drive the switching element at a pulse width modulated duty cycle.

5. The vehicle as recited in claim 4, wherein the controller is further operable to calculate a pulse width modulated duty cycle using the following equation:

$$PWM \text{ duty cycle} = \frac{(\text{power to glass} * \text{heater wire resistance})}{(\text{battery voltage})^2}.$$

6. The vehicle as recited in claim 1, wherein the controller is further operable to calculate a surface temperature of the windshield when power is initially applied based on a temperature at power off, an ambient temperature of vehicle operation, and a cooling time constant of the windshield material.

7. The vehicle as recited in claim 6, wherein the controller is further operable to calculate a temperature of the windshield during a warm-up period as a function of the following equation:

final glass temp=present windshield surface temp+
(power applied to windshield)*
(glass surface thermal resistance).

8. The vehicle as recited in claim 1, wherein the vehicle is an open forklift truck.

9. The vehicle as recited in claim 1, wherein the controller adjusts the power supply based on a rate of change of the ambient temperature of vehicle operation and the truck speed.

10. A method for heating a windshield in an open, man operated, vehicle to prevent condensation from accumulating on the windshield as it travels between a cold location and a warm location, wherein the warm location has a dew point temperature greater than the temperature of the cold location, the steps comprising:
(a) sensing an ambient temperature of vehicle operation;
(b) calculating a temperature of the windshield;
(c) applying electrical power to a heating assembly in the windshield to heat the windshield to a predetermined regulation temperature;
(d) adjusting the electrical power being applied to the heating assembly based on at least one of a speed of the vehicle and a rate of change of the ambient temperature of vehicle operation; and
(e) repeating steps (b) through (d) while the vehicle is in operation.

11. The method as recited in claim 10, wherein step (c) further comprises the step of calculating a maximum power level that can be applied at the current battery voltage.

12. The method as recited in claim 11, wherein step (c) further comprises the step of calculating a maximum power level that can be applied to the windshield and selecting the lower of the maximum power level and the maximum power level at the current battery voltage to apply to the heating assembly.

13. The method as recited in claim 10, wherein step (b) further comprises the steps of determining whether the vehicle has been off for a period of four or more cooling time constants and assigning the ambient temperature of vehicle operation as the temperature of the windshield when the vehicle has been off for more than four time constants.

14. The method as recited in claim 10, wherein step (b) comprises the step of calculating the temperature of the windshield using the following equation:

glass temperature=last glass temperature*
$e-$(time off/cooling time constant).

15. The method as recited in claim 10, wherein step (d) comprises providing a switching power supply at a PWM duty cycle calculated in accordance with the following equation:

$$PWM\ duty\ cycle = \frac{(power\ to\ glass * heater\ wire\ resistance)}{(battery\ voltage)}.$$

16. A forklift vehicle, comprising:
a battery;
a traction motor powered by a battery configured to move the vehicle between a first location having a cold storage temperature, and a second location having a dew point temperature greater than the cold storage temperature;
an operator compartment coupled to the traction motor and allowing an operator to ride in the vehicle;
a windshield coupled to said operator compartment and having first and second surfaces exposed to the ambient environment of vehicle operation, wherein the first surface faces the operator compartment, and the second surface faces away from the operator compartment;
a heating assembly disposed within the windshield and configured to supply heat thereto; and
a control circuit for supplying power to the heating assembly, the control circuit comprising:
a temperature sensor for sensing an ambient temperatures of vehicle operation;
a speed sensor for sensing a speed of the man-operated vehicle;
a voltage sensor for sensing a voltage of the battery;
a switching element for providing a switched power supply to the heating assembly; and
a controller in electrical communication with the heating elements, the temperature sensor and the speed sensor, the controller being operable to drive the switching element at a switching rate selected to supply electrical power to the heating assembly to heat the windshield to a predetermined temperature and to adjust the switching rate based on at least one of a sensed voltage level of the battery, a sensed ambient temperature of vehicle operation and a sensed speed of the man-operated vehicle, wherein the controller is further operable to calculate a surface temperature of the windshield when power is initially applied based on a temperature at power off, an ambient temperature of vehicle operation, and a cooling time constant of the windshield material.

17. The forklift vehicle of claim 16, wherein the controller is operable to calculate a pulse width modulated duty cycle for controlling the switching element.

18. The forklift vehicle of claim 16, wherein the controller is operable to adjust the switching rate based on the sensed ambient temperature of vehicle operation and the sensed speed.

19. The forklift vehicle of claim 18, wherein the controller is operable to adjust the switching rate based on the rate of change of the sensed ambient temperature of vehicle operation.

20. The forklift vehicle of claim 18, wherein the controller is operable to calculate a maximum power level and to drive the switching element based on the maximum power level.

21. A man-operated vehicle of the type powered by a battery and including a traction motor configured to move the vehicle:
a windshield mounted onto said vehicle adjacent the operator console;
a heating assembly disposed within the windshield and configured to supply heat thereto; and
a control circuit for supplying power to the heating assembly, the control circuit comprising at least one sensor for sensing at least one of an ambient temperature of vehicle operation and a speed of the man-operated vehicle, a power regulator connected to the heating assembly, and a controller in electrical communication with the heating assembly, and the at least one sensor, the controller being operable to drive the power regulator to maintain the windshield at a predetermined temperature and to adjust the power supply to the heating assembly from the power regulator based on a feedback from the at least one sensor, wherein the controller is further operable to calculate a surface temperature of the windshield when power is initially applied based on a temperature at power off, an ambient temperature of vehicle operation, and a cooling time constant of the windshield material.

22. The man-operated vehicle of claim 21, wherein the sensor comprises a temperature sensor and a speed sensor.

23. The man-operated vehicle of claim 21, wherein the controller is further operable to adjust the power supply based on a feedback signal providing a voltage of the battery.

* * * * *

UNITED STATES PATENT AND TRADEMARK OFFICE
CERTIFICATE OF CORRECTION

| | | |
|---|---|---|
| PATENT NO. | : 8,084,716 B2 | Page 1 of 1 |
| APPLICATION NO. | : 11/763953 | |
| DATED | : December 27, 2011 | |
| INVENTOR(S) | : Richard M. Day | |

It is certified that error appears in the above-identified patent and that said Letters Patent is hereby corrected as shown below:

IN THE SPECIFICATIONS:

Column 1, line 27 "track" should be changed to -- truck --
Column 1, line 43 "track" should be changed to -- truck --
Column 3, line 30 "track" should be changed to -- truck --
Column 3, line 35 "track" should be changed to -- truck --
Column 3, line 58 "sonic" should be changed to -- some --
Column 6, line 12 "batter" should be changed to -- battery --
Column 6, line 35 "*" should be changed to -- + --
Column 6, line 39 "time off/heating" should be changed to -- time on/heating --
Column 6, line 66 "Alter" should be changed to -- After --
Column 7, line 59 "beat" should be changed to -- heat --

IN THE CLAIMS:
Column 8, claim 1, lines 23-24 "temperatures" should be changed to -- temperature --
Column 10, claim 16, lines 14-15 "temperatures" should be changed to -- temperature --

Signed and Sealed this
Tenth Day of April, 2012

David J. Kappos
*Director of the United States Patent and Trademark Office*